US009736980B2

(12) United States Patent
Pruitt et al.

(10) Patent No.: US 9,736,980 B2
(45) Date of Patent: Aug. 22, 2017

(54) WIDE CUT ROTARY HEADER HAVING CROP CONVEYING SLINGER

(71) Applicant: AGCO Corporation, Hesston, KS (US)

(72) Inventors: Martin E. Pruitt, Hesston, KS (US); Shane Bollinger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/968,270

(22) Filed: Dec. 14, 2015

(65) Prior Publication Data

US 2016/0183455 A1    Jun. 30, 2016

Related U.S. Application Data

(60) Provisional application No. 62/097,710, filed on Dec. 30, 2014.

(51) Int. Cl.
*A01D 34/66* (2006.01)
*A01D 43/10* (2006.01)
*A01D 82/02* (2006.01)

(52) U.S. Cl.
CPC ......... *A01D 34/668* (2013.01); *A01D 34/664* (2013.01); *A01D 43/10* (2013.01); *A01D 82/02* (2013.01)

(58) Field of Classification Search
CPC combination set(s) only.
See application file for complete search history.

(56) References Cited

U.S. PATENT DOCUMENTS

| 4,166,350 | A | * | 9/1979 | Werner | A01D 34/664 56/13.6 |
| 5,433,064 | A | * | 7/1995 | Schmitt | A01D 34/667 56/13.9 |
| 7,340,876 | B1 | * | 3/2008 | Barnett | A01D 34/71 56/153 |
| 7,726,108 | B1 | * | 6/2010 | Pruitt | A01D 61/004 56/14.5 |
| 2005/0126142 | A1 | | 6/2005 | Rosenbalm et al. | |
| 2008/0066440 | A1 | | 3/2008 | Barnett | |
| 2009/0158699 | A1 | * | 6/2009 | Pruitt | A01D 34/665 56/6 |
| 2011/0146219 | A1 | * | 6/2011 | Pruitt | A01D 61/004 56/157 |

FOREIGN PATENT DOCUMENTS

WO      00/15022 A1    3/2000

OTHER PUBLICATIONS

Intellectual Property Office, International Search Report for UK Sister Application No. GB1500839.4, dated Jun. 25, 2015.

* cited by examiner

*Primary Examiner* — Alicia Torres

(57) ABSTRACT

A harvesting header has a crop conveying element fixed to an outboard cutter of a cutter bed. The crop conveying element includes at least one slinger attached to an upstanding spacer to space the slinger apart from a top wall of the cutter. The slinger includes a flat disc with a plurality of lobes extending outwardly from a central portion thereof and the spacer is shorter than an outer impeller such that a top extremity of the slinger is spaced below an upper level of an outer impeller. The spacer is also smaller in diameter than the outer impeller so as to provide a space below the slinger to allow flow of the crop material over the second outboard cutter, the space between the top wall of the cutter and the slinger being at least half of the height between a lower disc member and upper stationary grass ring of the outer impeller.

6 Claims, 6 Drawing Sheets

WIDE CUT ROTARY HEADER HAVING CROP CONVEYING SLINGER

RELATED APPLICATION

Under provisions of 35 U.S.C. §119(e), Applicants claim the benefit of U.S. Provisional Application No. 62/097,710, entitled Wide Cut Rotary Header Having Crop Conveying Slinger and filed Dec. 30, 2014, which is incorporated herein by reference.

BACKGROUND OF THE INVENTION

Field of Invention

This invention relates to crop harvesting machines of the type that use rotary cutters to sever standing crops from the field and then condition the cut crop between one or more sets of conditioning rolls before depositing the crop back onto the ground in the form of a windrow or swath and more particularly, it relates to wide cut machines in which the cutting width is greater than the width of a central opening leading to the conditioning rolls such that crop materials cut outboard of the opening is moved inwardly from the outboard cutters with a crop conveying slinger.

Description of Related Art

Wide cut rotary harvesters present inherent challenges in getting outboard severed crop materials to flow smoothly and without hesitation in a lateral direction toward the center of the machine before then turning rearwardly and moving through the central discharge opening into the conditioner rolls. Any hesitation on the part of the crop materials as they "turn the corner" and move rearwardly into the conditioner rolls can cause a number of significant problems, both in the quality of the finished windrows and the quality of cutoff being achieved by the rotary cutters. Due to the increased speeds at which rotary harvesters can travel compared to that of sickle-type machines, cutoff, feeding and control problems are exacerbated in rotary machines due to the dramatically increased volume of cut material flowing through the machines.

In one preferred rotary cutter bed design, a group of inboard cutters of the bed are arranged with their axes of rotation directly in front of the conditioner rolls. At least one, and preferably two, additional outboard cutters are provided at each end of the bed and have their axes of rotation located outboard of the conditioning structure. The outboard cutters both rotate in the same direction, with their front extremities moving generally inwardly toward the center of the machine to convey outboard cut materials toward the inboard cutters. Most of the cutters of the inboard group are arranged in oppositely rotating pairs with other cutters of the group such that cut crop materials from the paired cutters in the inboard group are directed straight back into the conditioner rolls in a number of streams.

As the crops are cut and moved toward the crop conditioner opening, the volume of crop increases as it approaches the conditioning rolls. As the crop volume increases, it can have a tendency to be compressed in the horizontal direction and expand in the vertical direction. As this crop expands in the vertical direction, there can be a hesitation at the upper support structure. As a result of this hesitation, crop flows into the conditioner rolls in a non-uniform manor. The result of this non-uniform flow is evident in the form of slugs, over-conditioned crop, and a bunchy swath or windrow. These conditions present drying issues along with poor quality hay in bales.

Overview of the Invention

In one embodiment, the invention is directed to a harvesting header having a set of centrally disposed conditioner rolls comprising conditioning structure to condition crop and a rotary cutter bed. The rotary cutter bed has a plurality of rotary cutters extending across the path of travel of the header to define a cutting plane. Each cutter is rotatable about an upright axis, and the conditioner rolls are located behind the cutter bed to condition crop cut by the rotary cutter bed. The plurality of rotary cutters include a set of inboard cutters disposed inboard of the lateral limits of the conditioning structure on conditioner rolls and a set of outboard cutters on either side of the conditioner rolls disposed outboard of the conditioning structure on conditioner rolls. The set of outboard cutters on each side of the cutter bed includes an outermost outboard cutter and a second outboard cutter adjacent the outermost outboard cutter.

An outer impeller is fixed to the outermost outboard cutter for rotation therewith to convey cut crop material laterally inwardly toward the center of the header. The outer impeller has a lower disc member forming the bottom of an impeller cage and an upper stationary grass ring. An intermediate impeller is located between the axes of rotation of the two outboard cutters, wherein the intermediate cage-like impeller is suspended on the harvesting header above the cutting plane and not fixed to any of the cutters and rotates in the same direction as the outboard impeller.

A crop conveying element is fixed to the second outboard cutter for rotation therewith. The crop conveying element includes at least one slinger attached to an upstanding spacer to space the slinger apart from a top wall of the second outboard cutter, wherein the slinger includes a flat disc with a plurality of lobes extending outwardly from a central portion thereof and wherein the spacer is shorter than impeller such that a top extremity of the slinger is spaced below an upper level of the outer impeller. The spacer is also smaller in diameter than the outer impeller so as to provide a space below the slinger allow flow of the crop material over the second outboard cutter, the space between the top wall of the cutter and the slinger being at least half of the height between the lower disc and upper stationary grass ring of the outer impeller.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
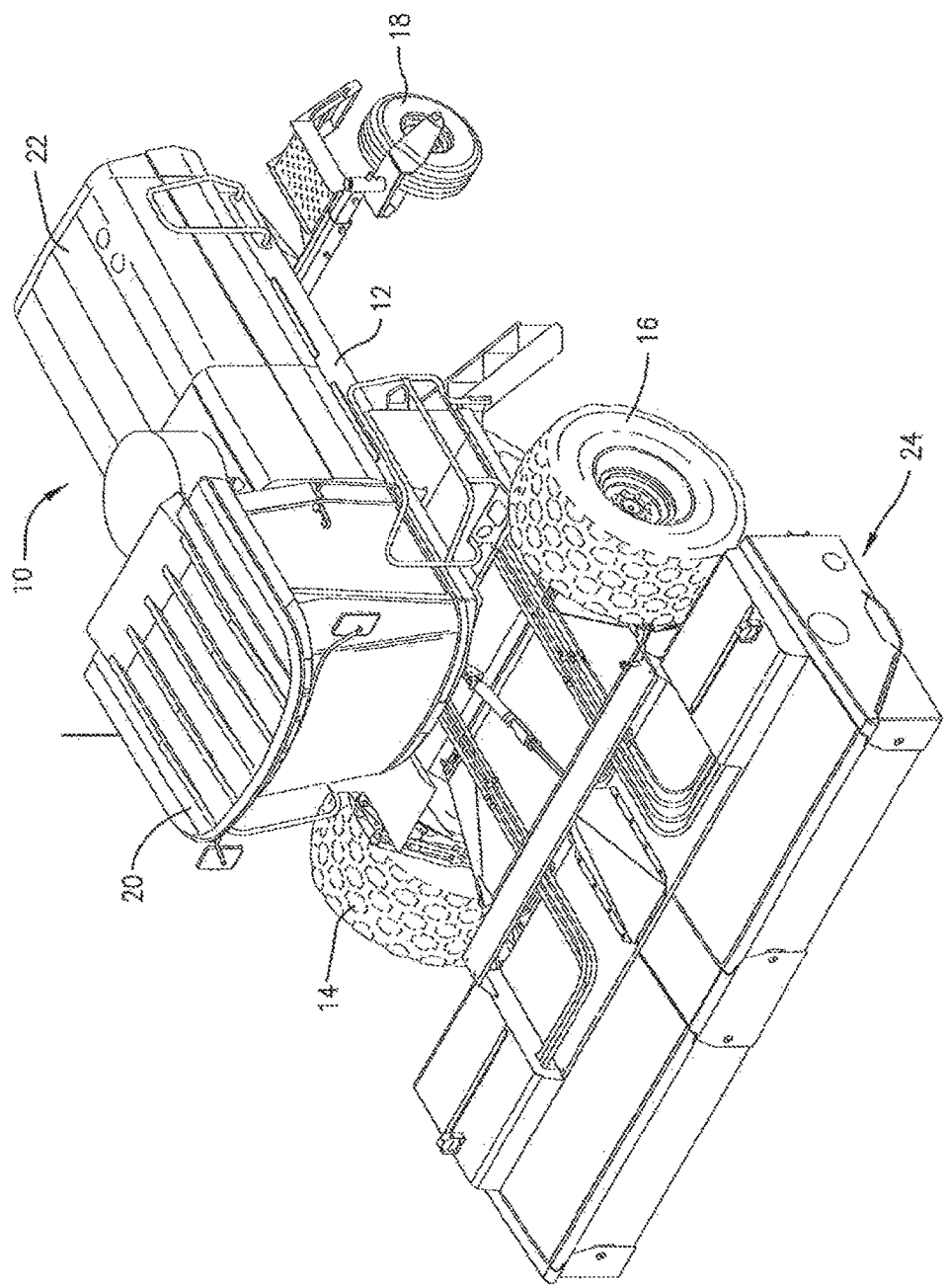
FIG. 1 is a left front perspective view of a self-propelled windrower exemplifying one type of harvesting machine that may employ a rotary cutter header in accordance with the principles of the present invention.

Referring initially to FIG. 1, the harvester selected for illustration in that figure comprises a self-propelled windrower 10 operable to mow and collect standing crop in the field, condition the cut material as it moves through the machine to improve its drying characteristics, and then return the conditioned material to the field in a windrow or swath. Windrower 10 includes a chassis or frame 12 supported by a pair of front drive wheels 14, 16 and a pair of rear caster wheels 18 (only the left rear caster wheel 18 being illustrated) for movement across a field to be harvested. Frame 12 carries a cab 20, within which an operator controls operation of windrower 10, and a rearwardly spaced compartment 22 that houses a power source (not shown) such as an internal combustion engine. A harvesting header 24 is supported on the front of frame 12 in a manner well understood by those skilled in the art.

Figure 2:
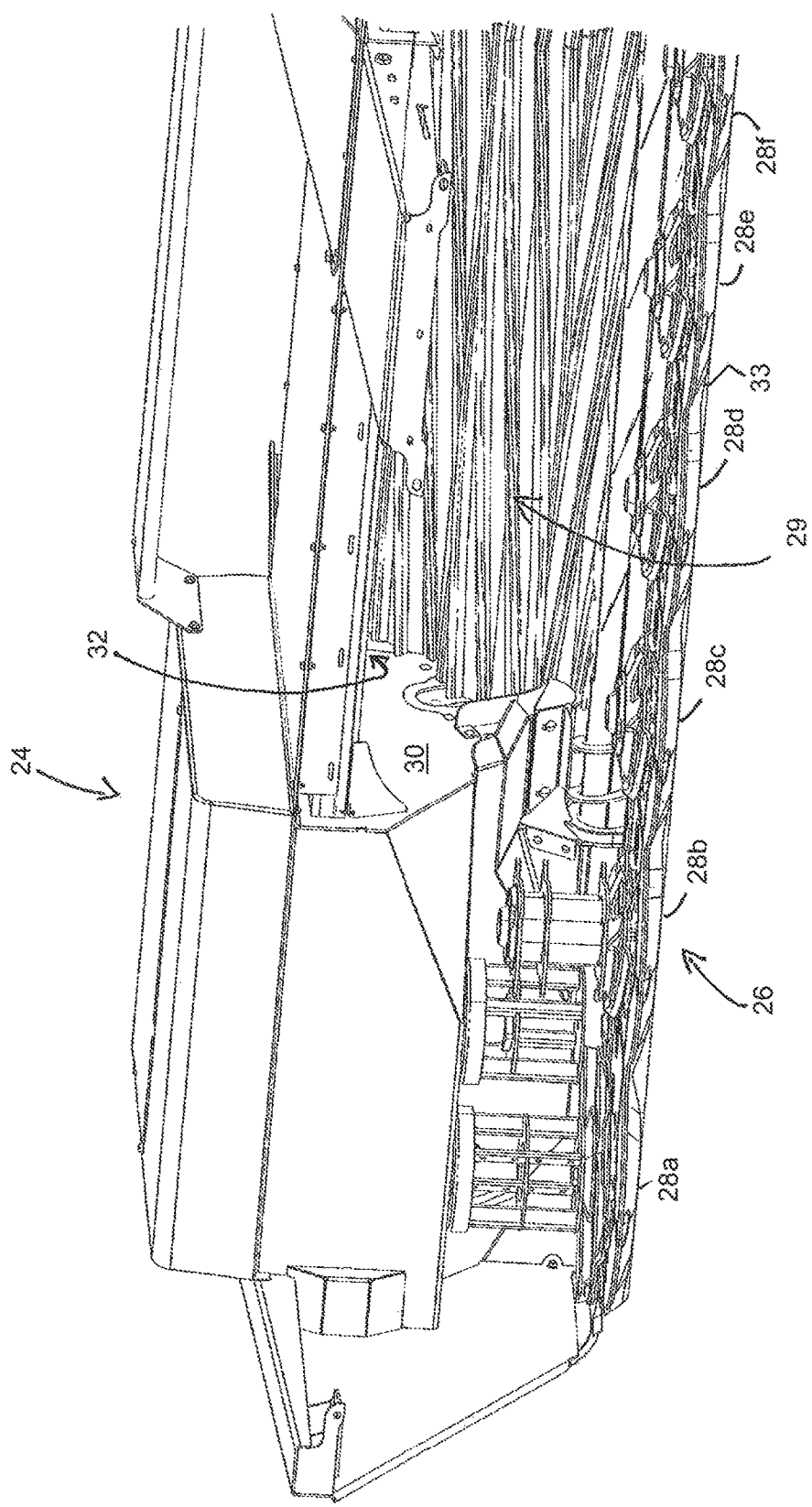
FIG. 2 is a fragmentary, front perspective view of the right end portion of the header with structure removed to reveal details of construction.

With reference to the remaining figures, header 24 includes a rotary cutter bed 26 across the front of the machine that serves as the means by which standing crops are severed as the windrower advances across a field. In the illustrated embodiment, cutter bed 26 includes a series of rotary cutters 28 extending across the path of travel of the machine, each cutter 28 being rotatable about its own upright axis. In one embodiment, the cutter bed 26 has ten rotary cutters 28 across the width of the cutter bed. However, a larger or smaller number of cutters 28 could be provided. For the sake of convenience, the cutters 28 in FIG. 2 are denoted by the numerals 28a-28f, beginning with the rightmost cutter 28 as viewed from the rear of the machine. While FIG. 2 illustrates one side of the cutter bed 26, it will be understood that the opposing side of the header 24 may be of a design that is a substantial mirror image of the illustrated side.

In the illustrated embodiment, header 24 has a set of centrally disposed conditioner rolls 29 behind the cutter bed 26. The axes of rotation of cutters 28c-28f are all disposed inboard of the lateral limits conditioning structure on rolls 29 such that those cutters may be described as a group of "inboard" cutters. On the other hand, the axes of rotation of cutters 28a and 28b are all disposed outboard of the conditioning structure on rolls 29 such that those cutters may be described as "outboard" cutters. While the illustrated embodiment has a set or pair of outboard cutters on each side, other embodiments may utilize more or fewer outboard cutters. An exemplary cutter bed 26 and set of conditioner rolls 29 is illustrated in commonly assigned U.S. Pat. No. 7,726,108.

Header 24 is constructed in such a way as to present a pair of upright, laterally spaced apart panels 30 behind cutter bed 26 that define a crop conditioning region in which the set of conditioning rolls 29 is located. The front extremities of panels 30 cooperate to in part define lateral boundaries of an opening 32. In the illustrated embodiment, the set of rolls 29 includes two pairs of cooperating conditioner rolls 29, although a single pair or more than two pairs could be utilized without departing from the principles of the present invention. Conditioner rolls 29 may assume a variety of configurations without departing from the principles of the present invention. For example, the rolls could all be hard, metal rolls, or some could be softer rolls having compressible outer surfaces. While different conditioning actions are achievable with different roll configurations and materials, the particular choice of such configurations and materials is not critical insofar as the present inventive concepts are concerned. In all instances, however, the conditioner rolls will have some kind of conditioning structure on their outermost peripheral surfaces, whether such surfaces are ribbed, grooved or smooth, for example. As conditioner rolls 29 are well known in the art, they need not be discussed further herein.

As is known in the art, cutters are arranged in oppositely rotating pairs such as the pair 28b, 28c and the pair 28d, 28e. One cutter of each pair rotates in a counterclockwise direction viewing FIG. 2, and the other rotates in a clockwise direction viewing that same figure. Thus, using the paired cutters 28b and 28c as an example, cutter 28b rotates in a counterclockwise direction while 28c rotates in a clockwise direction. While paired cutters 28d, 28e of the inboard group cooperate with other inboard cutters, the end cutter 28c in the group cooperate with outboard cutter 28b. Thus, each of the first and last pairs of oppositely rotating cutters comprises a "mixed" pair of cooperating cutters consisting of one inboard cutter and one outboard cutter.

Each pair of oppositely rotating cutters 28 sends a stream of severed material rearwardly between them as the machine moves through the field of standing crop. The outermost outboard cutter 28a rotates in the same direction as the inwardly adjacent outboard cutter 28b. Thus, outermost outboard cutter 28a rotates in a counterclockwise direction viewing FIG. 2. Consequently, crop material cut by outboard cutters 28a, 28b is thrown laterally inwardly across the front of the machine to the overlap region between 28b and 28c where it is swept rearwardly.

Cutters 28a-28f are rotatably supported on an elongated, flat gear case 33 that extends underneath the cutters for the full effective width of header 24 and driven by one or more hydraulic motor (not shown) as will be understood by one skilled in the art. Additionally, each of the cutters 28 includes a generally elliptical, formed metal knife carrier 34, such as illustrated by the cutters 28a and 28b in FIG. 5, and a pair of free-swinging knives 36 at opposite ends of carrier 34 in a well-known manner. The circular paths of travel of the knives 36 of adjacent cutters 28 overlap one another.

As is known in the art, the outermost outboard cutter 28a is provided with an upright, generally cylindrical, cage-like impeller 38 fixed to its corresponding carrier 34 for rotation therewith. Impeller 38 helps convey cut crop materials laterally inwardly toward the center of the header 24. An intermediate, depending, upright, cage-like impeller 40 is located inwardly beside impeller 38 generally centrally between the axes of rotation of the two outboard cutters 28a, 28b. In the illustrated embodiment, the impeller 40 is not fixed to any of the cutters, but is instead suspended by overhead structure not shown above the cutting plane of knives 36 for rotation in the same direction as the adjacent outboard impeller 38. The bottom extremity of impeller 40 is spaced a short distance above the cutting plane of the knives 36. In the illustrated embodiment, outboard impeller 38 is formed with lower, middle and upper discs 42, 43, 44. An upper stationary grass ring 48 (FIG. 6) is positioned around an upper portion of the outboard impeller 38 to protect the upper portion of the outboard impeller 38.

Figure 3:
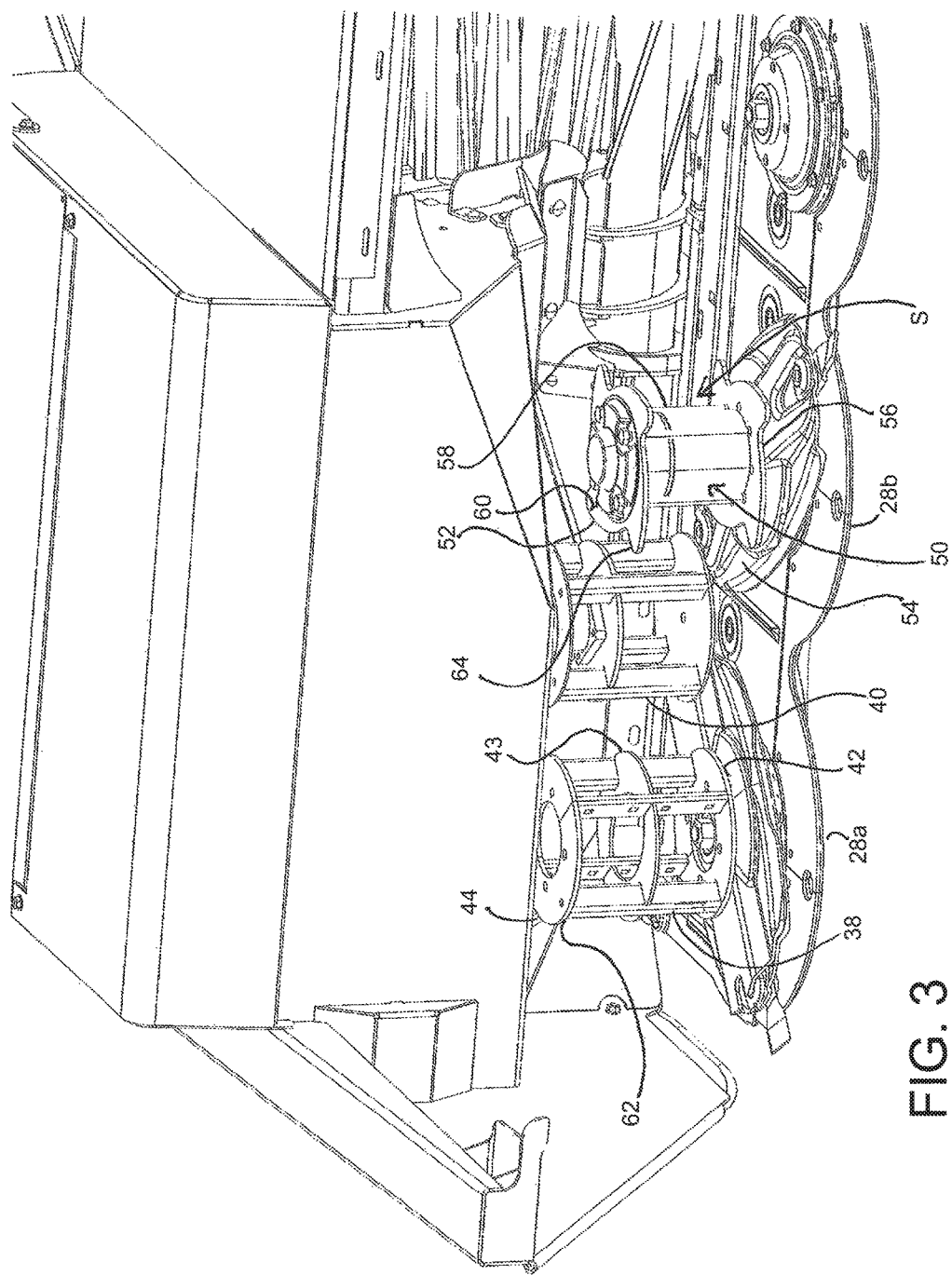
FIG. 3 is an enlarged front perspective view of the right end portion of the header with structure removed to reveal details of construction.
Figure 4:
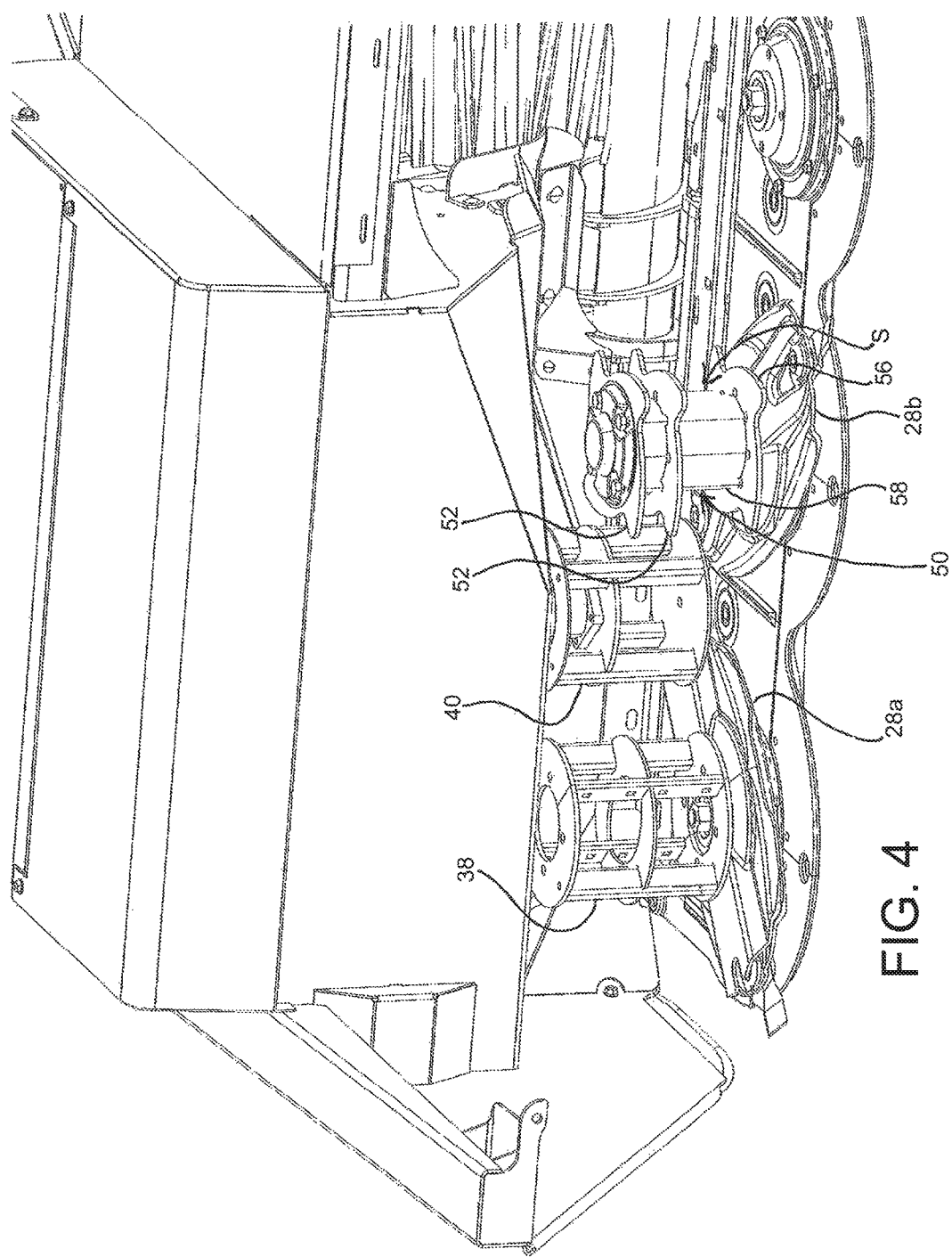
FIG. 4 is an enlarged front perspective view of another embodiment of the right end portion of the header with structure removed to reveal details of construction.

According to the invention, at least one crop conveying element 50 is fixed to the inner outboard cutter 28b for rotation therewith. The crop conveying element 50 includes at least one slinger 52 spaced apart from a top wall 54 of the cutter 28b. FIG. 3 illustrates an embodiment with a base 56 mounted adjacent the top wall 54 of the cutter 28b and single slinger 52 attached to a short, upstanding, generally cylindrical spacer 58. The spacer 58 is shorter than impeller 38 such that a top extremity 60 of the slinger 52 is spaced below an upper level 62 of the outer impeller 38. The spacer 58 is smaller in diameter than the impeller 38 to provide a space S below the slinger 52 so as to not impede the natural flow of the crop material over the cutter 28b. FIG. 4 illustrates an embodiment with two slingers 52 attached to the spacer 58. Both slingers 52 are positioned in the upper portion of the spacer 58 so as to preserve the crop-passing space S between the lower-most slinger 52 and the cutter 28b.

Figure 5:
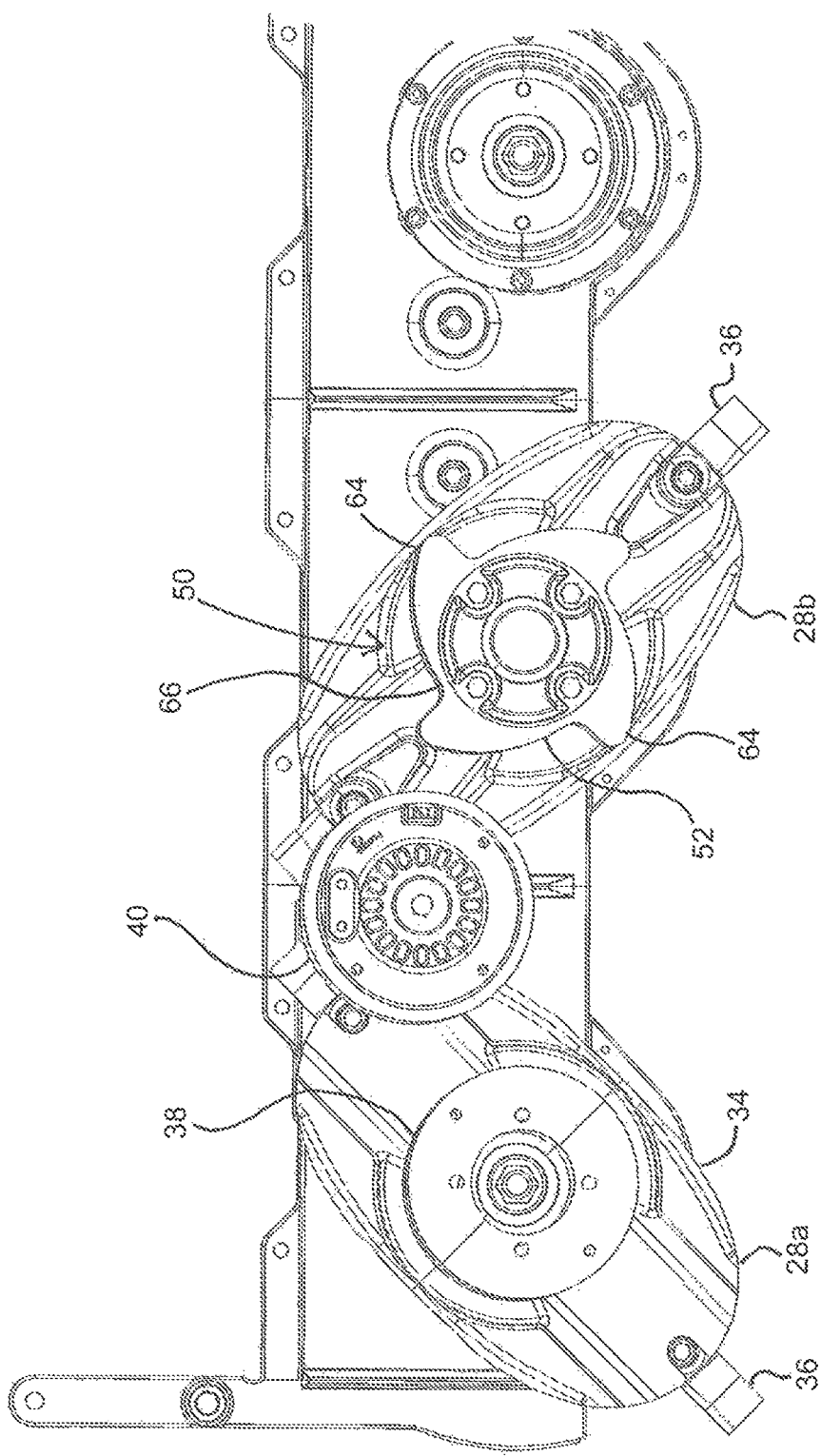
FIG. 5 is a fragmentary top plan view of the header with portions thereof removed to reveal details of construction.

In one embodiment, the slinger 52 is a generally flat disc with a plurality of lobes 64 extending outwardly from a central portion 66 thereof. As best seen in FIG. 5, the illustrated slinger 52 has four lobes 64 positioned equidistant around the circumference of the slinger 52. However, more or fewer lobes 64 can be used. Fewer lobes 64 have been found to provide more aggressive feeding. Desirably, the slinger 52 has a thickness of between about 0.2 to 0.5 inches (0.5 to 1.3 cm).

Figure 6:
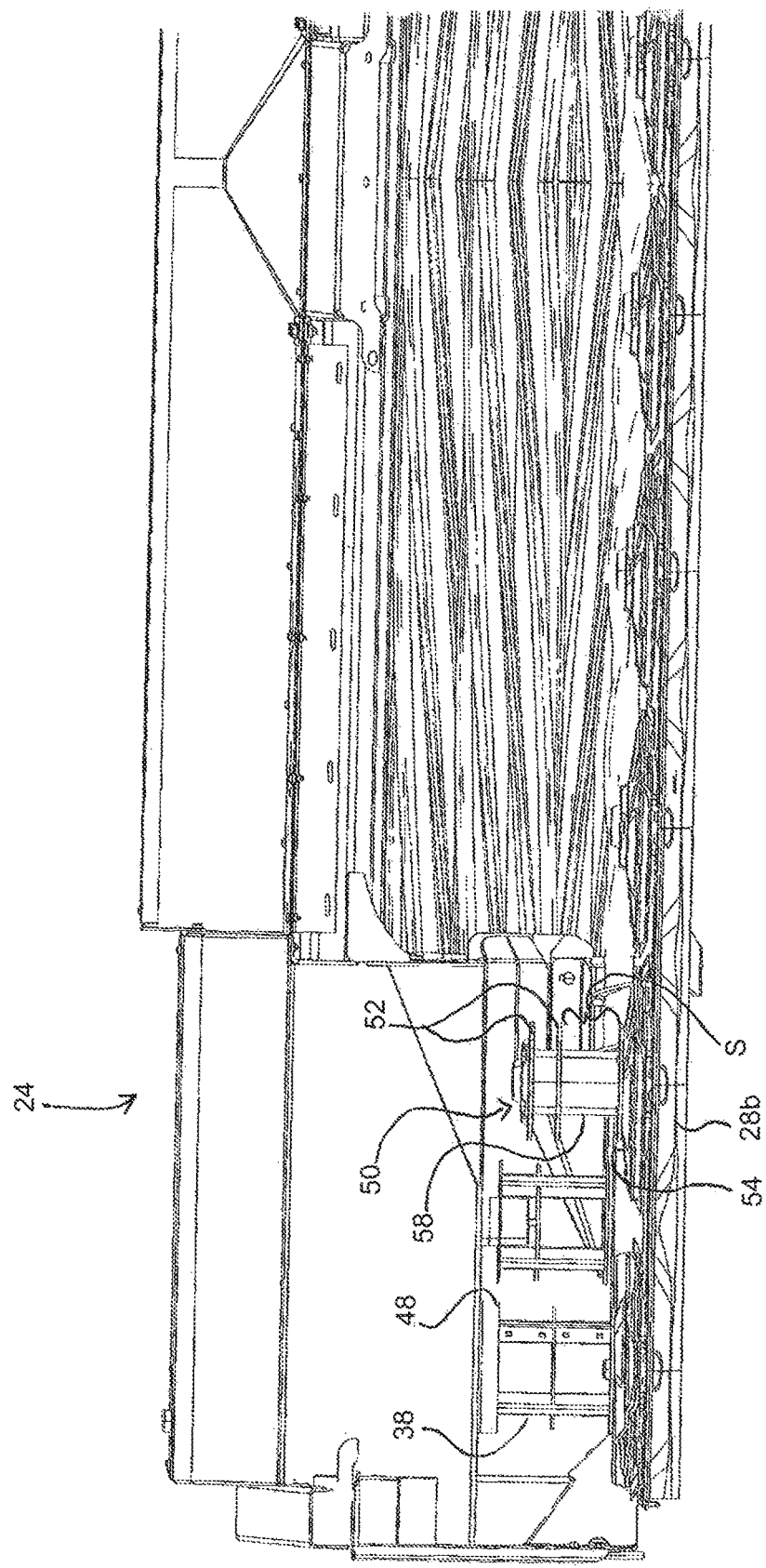
FIG. 6 is a front elevational view of the header with covering portions thereof removed.

As best seen in FIG. 6, desirably the lower-most slinger 52 is positioned on the spacer 58 such that the space S between the top wall 54 of the cutter 28b and the lower-most slinger 52 is at least half of the height between the lower and upper discs 42, 44 of the impeller 38 so as to preserve the crop-passing space S between the lower-most slinger 52 and the cutter 28b. In the embodiment with just a single slinger 52, the lone slinger 52 is positioned above this mid-height of the impeller 38.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A harvesting header comprising:
a set of centrally disposed conditioner rolls comprising conditioning structure to condition crop;
a rotary cutter bed comprising:
a plurality of rotary cutters extending across the path of travel of the header to define a cutting plane, each cutter being rotatable about an upright axis, the conditioner rolls being behind the cutter bed to condition crop cut by the rotary cutter bed, wherein the plurality of rotary cutters comprises a set of inboard cutters disposed inboard of the lateral limits of the conditioning structure on the conditioner rolls and a set of outboard cutters on either side of the conditioner rolls disposed outboard of the conditioning structure on the conditioner rolls, wherein the set of outboard cutters on each side of the cutter bed comprises an outermost outboard cutter and a second outboard cutter adjacent the outermost outboard cutter;
an outer impeller fixed to the outermost outboard cutter for rotation therewith to convey cut crop material laterally inwardly toward the center of the header, the outer impeller having a lower disc member forming the bottom of an impeller cage and an upper stationary grass ring;
an intermediate impeller located between the axes of rotation of the set of outboard cutters on either side of the conditioner rolls, wherein the intermediate impeller is suspended on the harvesting header above the cutting plane and not fixed to any of the cutters and rotates in the same direction as the outer impeller; and
a crop conveying element fixed to the second outboard cutter for rotation therewith, the crop conveying element comprising at least two slingers attached to an upstanding spacer to space the slingers apart from a top wall of the second outboard cutter, with one of the at least two slingers spaced below the other of the at least two slingers, wherein each of the at least two slingers comprises a flat disc with a plurality of lobes extending outwardly from a central portion thereof and wherein the spacer is shorter than the outer impeller such that a top extremity of the slingers is spaced below an upper level of the outer impeller, and wherein the spacer is smaller in diameter than the outer impeller so as to provide a crop-passing space below the lower-most one of the at least two slingers to allow flow of the crop material over the second outboard cutter, said space between the top wall of the cutter and the lower-most slinger being at least half of the height between the lower disc and the upper stationary grass ring of the outer impeller.

2. The harvesting header of claim 1 wherein the second outboard cutter comprises a pair of second outboard cutters with one on each side of the conditioner rolls.

3. The harvesting header of claim 1 wherein a bottom extremity of the intermediate impeller is spaced a short distance above the cutting plane of the cutters.

4. The harvesting header of claim 1 wherein the outer impeller is formed with lower, middle and upper discs.

5. The harvesting header of claim 1 wherein each of the slingers comprises four lobes positioned equidistant around the circumference of the slinger.

6. The harvesting header of claim 1 wherein the at least two slingers are positioned above the mid-height of the outer impeller.

* * * * *